Jan. 18, 1938.  A. W. TRONNIER  2,106,077
CORRECTED OBJECTIVE
Filed May 7, 1936
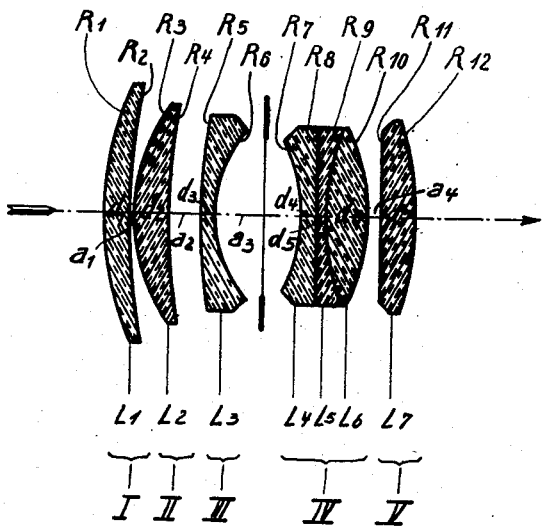
Inventor
Albrecht W. Tronnier
By Sommers & Young
Attys.

Patented Jan. 18, 1938

2,106,077

UNITED STATES PATENT OFFICE 2,106,077

CORRECTED OBJECTIVE

Albrecht Wilhelm Tronnier, Bad Kreuznach, Germany, assignor to the corporation of Jos. Schneider & Co., Optotechnische Gesellschaft, Berlin, Germany Application May 7, 1936, Serial No. 78,451
In Germany November 23, 1935

1 Claim. (Cl. 88—57)

This invention relates to a light intensity, spherically, chromatically and astigmatically corrected objective of five individual members in the air, three of which have positive refracting power while the remaining two members have dispersive action, are meniscus-shaped, encompass the shutter and present hollow exterior surfaces thereto. Two of the three collective members are adjacent each other, are disposed on the object side and are so constructed that the radius of the front surface of the second collective member which is directed toward the object and convex thereto, is smaller than the radius front surface of the front member directed toward the object which is likewise convex toward the object. Only a single collective member, in the air, is provided on the image side of the objective.

An object of the invention is to provide an objective substantially of the Gauss type with an added freely positioned collective member and which Gauss objective, as is known, formed as a double objective, consists of only four separate members in the air, two of which have dispersive action, encompass the shutter, are meniscus-shaped and have hollow outer surfaces directed toward the shutter, while the singly positioned collective members are disposed one before the front one of the two dispersive members, and the other after the rear one of the dispersive members.

By means of a further collective member disposed in front of an objective of the Gauss type, the present invention offers, as compared with known objectives of this kind, a particularly zone-free correction over a relatively extensive image field, with relatively high light intensity. The stepping down of the refractive power within the system is suitably so provided that the two front collective members together with the adjacent dispersive member have a smaller positive refractive power than the two members of the objective disposed on the other side of the diaphragm.

The present construction, as compared with known objectives, is characterized by a light-intensive, spherically, chromatically, and astigmatically corrected objective comprising a diaphragm and five components in contact with the air, three of which components have positive refractive power and two of which are meniscus-shaped, have dispersive effect, encompass the diaphragm, and have hollow surfaces facing toward the diaphragm, two of the three collecting components being juxtaposed and being arranged on the object side of the objective and, together with the dispersive component coordinated therewith have a smaller positive refractive power than the two components on the other side of the diaphragm; each of the two collective components on the object side of the diaphragm has a convex surface toward the object, the radius of curvature R3 of the said convex surface of the second component L2 from the object is smaller than the radius of curvature R1 of the corresponding convex surface of the component L1 first from the object, the first-mentioned radius of curvature R3 being at least equal to but not greater than 2¼ times as large as the radius of curvature R6 of the surface of the dispersive component L3 coordinated with the said two juxtaposed collective components, directed toward the diaphragm.

An objective in accordance with the invention is diagrammatically shown in the accompanying drawing in which the single figure is a diagrammatic sectional view of the objective lens comprising five air spaced lens groups and having seven lens elements. The following tabular illustration corresponds to the drawing, with the condition that it is provided for a focal distance of 100 mm., and accordingly all distances are given in millimeters. In the drawing, the radii are designated by R, the thicknesses by $d$ and the air distances by $a$. The glasses of the lenses L are characterized by the refractive index $n_F$ for the blue light and the Abbe number $\nu$. The axial section distance on the image side is designated by $p_0$, and the diaphragm is arranged in the large intermediate air space of the objective built up of seven lenses.

$f_0 = 100$    $1:1.9$    $p_0' = 70.45$

| Radii | Thicknesses and distances | |
|---|---|---|
| R1 = +61.02 | d1 = 5.535 | L1 |
| R2 = +159.9 | a1 = 0.242 | Air |
| R3 = +38.82 | d2 = 6.585 | L2 |
| R4 = +162.1 | a2 = 6.343 | Air |
| R5 = +159.9 | d3 = 2.929 | L3 |
| R6 = +24.90 | a3 = 17.09 | Diaphragm space |
| R7 = −28.56 | d4 = 3.030 | L4 |
| R8 = plane | d5 = 1.656 | L5 |
| R9 = +61.02 | d6 = 7.999 | L6 |
| R10 = −43.10 | a4 = 2.444 | Air |
| R11 = +371.1 | d7 = 6.343 | L7 |
| R12 = −61.02 | | |

*Kinds of glasses*

|  |  |  |  |
|---|---|---|---|
| I. | L1 | $n1=1.62812$ | $\nu1=60.4$ |
| II. | L2 | $n2=1.61780$ | $\nu2=58.7$ |
| III. | L3 | $n3=1.59183$ | $\nu3=40.6$ |
| IV. | L4 | $n4=1.59183$ | $\nu4=40.6$ |
| | L5 | $n5=1.63585$ | $\nu5=36.7$ |
| | L6 | $n6=1.63108$ | $\nu6=58.0$ |
| V. | L7 | $n7=1.64548$ | $\nu7=56.2$ |

Thus, R3 is less than R1 or 2¼ times R6 but greater than R6 alone.

What I claim is:

A light-intensive, spherical, chromatically and astigmatically corrected objective of the type comprising a diaphragm and five components in contact with the air, three of which have positive refractive power, while the remaining two are meniscus-shaped, have a dispersive effect, encompass the diaphragm, and have hollow outer surfaces toward the diaphragm, two of the three collecting components being juxtaposed and being arranged on the object side and have, together with the dispersive component co-ordinated therewith, a smaller positive refractive power than the two components of the objective arranged on the other side of the diaphragm, characterized in that each of the two collective components on the object side of the diaphragm has a convex surface toward the object, the radius of curvature R3 of the said convex surface of the second component L2 from the object is smaller than the radius of curvature R1 of the corresponding convex surface of the component L1 first from the object, the first-mentioned radius of curvature R3 being at least equal to but not greater than 2¼ times as large as the radius of curvature R6 of the surface of the dispersive component L3 co-ordinated with the said two juxtaposed collective components, directed toward the diaphragm.

ALBRECHT WILHELM TRONNIER.